(12) United States Patent
Mochizuki et al.

(10) Patent No.: US 7,054,105 B2
(45) Date of Patent: May 30, 2006

(54) MAGNETIC RECORDING HEAD FOR PERPENDICULAR RECORDING AND INCLUDING A PORTION PROTRUDING TOWARD A MAIL POLE AND MAGNETIC DISC STORAGE APPARATUS MOUNTING THE MAGNETIC HEAD

(75) Inventors: Masafumi Mochizuki, Koganei (JP); Atsushi Nakamura, Koganei (JP); Kimitoshi Etoh, Odawara (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 240 days.

(21) Appl. No.: 10/693,886

(22) Filed: Oct. 28, 2003

(65) Prior Publication Data
US 2004/0228030 A1 Nov. 18, 2004

(30) Foreign Application Priority Data
May 13, 2003 (JP) ............................ 2003-134660

(51) Int. Cl.
*G11B 5/187* (2006.01)
(52) U.S. Cl. ...................................... 360/125; 360/126
(58) Field of Classification Search ..................... None
See application file for complete search history.

(56) References Cited
U.S. PATENT DOCUMENTS

| | | | |
|---|---|---|---|
| 4,656,546 A | 4/1987 | Mallory | 360/110 |
| 5,920,449 A * | 7/1999 | Tagawa | 360/122 |
| 6,636,390 B1* | 10/2003 | Funayama et al. | 360/317 |
| 6,710,972 B1* | 3/2004 | Mochizuki et al. | 360/123 |
| 6,710,973 B1* | 3/2004 | Okada et al. | 360/125 |
| 6,771,462 B1* | 8/2004 | Khizroev et al. | 360/122 |
| 6,775,099 B1* | 8/2004 | Kuroda et al. | 360/126 |
| 6,795,277 B1* | 9/2004 | Tsuchiya et al. | 360/317 |
| 2002/0039254 A1* | 4/2002 | Taguchi et al. | 360/125 |
| 2002/0171975 A1* | 11/2002 | Plumer et al. | 360/125 |

FOREIGN PATENT DOCUMENTS

| | | | |
|---|---|---|---|
| JP | 2002-092820 | | 9/2000 |
| JP | 2001-101612 A | * | 4/2001 |

OTHER PUBLICATIONS

Mallary, M., Torabi, A. and Benakli, M; "One Terabit per Square Inch Perpendicular Recording Conceptual Design"; IEEE Transactions on Magnetics, vol. 38, No. 4, Jul. 2002, pp. 1719-1724.

(Continued)

*Primary Examiner*—Jefferson Evans
(74) *Attorney, Agent, or Firm*—Reed Smith LLP; Stanley P. Fisher, Esq.; Juan Carlos A. Marquez, Esq.

(57) ABSTRACT

A magnetic field distribution of a recording head is made linear so that a curvature of the magnetic-transition pattern in recording bit cells can be corrected. In a SPT head having a main pole 1 and an auxiliary pole 3, a magnetic layer 32 is disposed on a trailing side of the main pole. The magnetic layer is provided with a protruding portion 32a protruding towards the main pole. A width Nw of a side of the protruding portion opposite the main pole of the protruding portion is made smaller than a width Tww of the main pole on the trailing side.

10 Claims, 12 Drawing Sheets

OTHER PUBLICATIONS

Kiyoshi Yamakawa, Kazuyuki Ise, Shingo Takahashi and Kazuhiro Ouchi; "A New Single-Pole Head Structure for High Writability"; IEEE Transactions on Magnetics, vol. 38, No. 1, Jan. 2002, pp. 163-168.

Xia, Weixing et al., "Relation of Field Gradient of Single Pole Head and Transition Parameter in Perpendicular Double Layer Media", Technical Report of the Institute of Electronics, Information and Communication Engineers, MR2001-87, pp. 21-27.

Matsubara, Ryo et al., "Recording Field Analysis of a High Track Density SPT Head (3)—SPT head with tapered main pole, tapered return path, and side shield yokes-", Technical Report of the Institute of Electronics, Information and Communication Engineers, MR2002-65, 6 pages.

Hannay, J.D. et al., "Investigation of Perpendicular Write Head Performance at High Densities Using a Hybrid Recording System Model", Abstract No. FA02 of the 47th Annual Conference on Magnetism and Magnetic Materials, Nov. 14, 2002, pp. 275.

Shukh, A. and J. Van Ek, "Write Field Gradient Effect on Perpendicular Recording", Abstract No. FA03 of the 47th Annual Conference on Magnetism and Magnetic Materials, Nov. 14, 2002, pp. 275.

* cited by examiner

SKEW ANGLE

CONTOUR LINE OF WRITE FIELD WHICH IS EQUAL TO THE HALF INTENSITY OF MAXIMUM WRITE FIELD

CONTOUR LINE OF WRITE FIELD WHICH IS EQUAL TO THE HALF INTENSITY OF MAXIMUM WRITE FIELD

FIG.12A
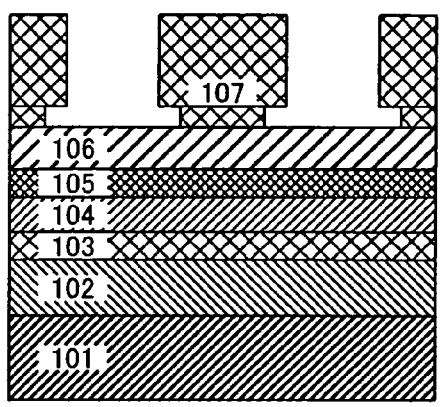
FIG.12B
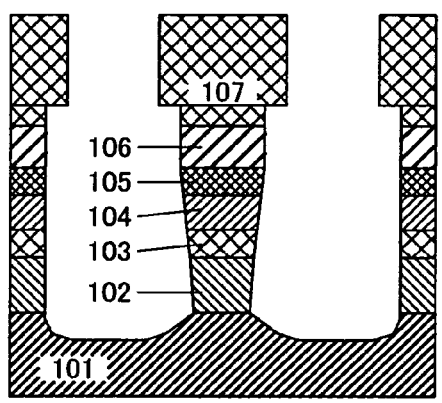
FIG.12C
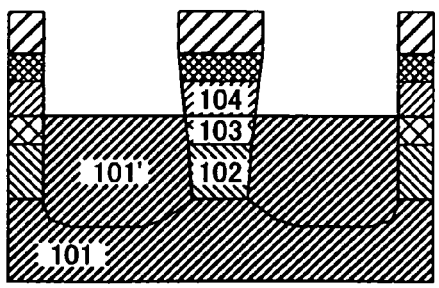
FIG.12D
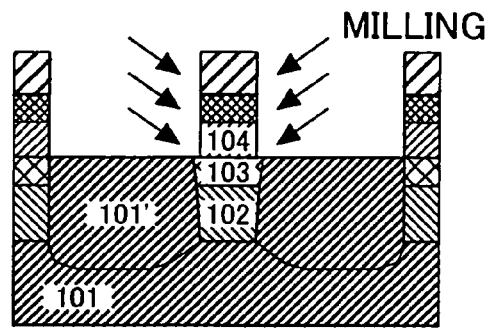
FIG.12E
FIG.12F
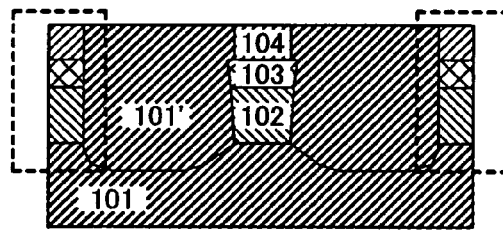
FIG.12G
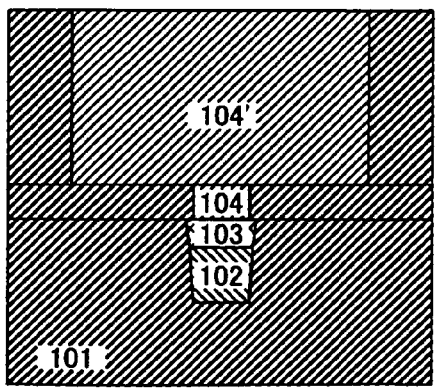

MAGNETIC RECORDING HEAD FOR PERPENDICULAR RECORDING AND INCLUDING A PORTION PROTRUDING TOWARD A MAIL POLE AND MAGNETIC DISC STORAGE APPARATUS MOUNTING THE MAGNETIC HEAD

BACKGROUND OF THE INVENTION

1. Technical Field

The present invention relates to a magnetic head suitable for perpendicular magnetic recording, a process of manufacturing the magnetic head, and a magnetic disc apparatus mounting the magnetic head.

2. Background Art

In magnetic disc apparatuses, data on a recording medium is read and written using a magnetic head. In order to increase the recording volume per unit area on a magnetic disc, areal density must be increased. In the current longitudinal recording systems, however, as the length of bits that are recorded decreases, the areal density cannot be increased due to thermal fluctuations in the magnetization in the medium. To solve this problem, a perpendicular recording system has been proposed whereby a magnetization signal is recorded in a direction perpendicular to the medium.

There are two types of perpendicular magnetic recording. One employs a double-layer perpendicular magnetic recording medium comprising a soft underlayer, and the other employs a single-layer perpendicular medium having no underlayer. When a double-layer perpendicular magnetic recording medium is used as the recording medium, recording must be carried out using a so-called single pole type (SPT) head having a main pole and an auxiliary pole, so that a larger intensity of magnetic field can be applied to the medium.

In addition to the strength of the head field for recording, the magnetic field gradient in the perpendicular component of the head field with which the transition width of the recording bit cells is determined, namely the field gradient in the head-field perpendicular component in the direction of head transport, is a very important factor for realizing high recording density. In order to achieve ever-higher recording density in the future, the field gradient must be further increased. Also, the curvature of the magnetic-transition pattern in the recording bit cells poses an obstacle for the realization of higher recording densities.

In order to improve recording density, track density and linear density must be increased also in perpendicular recording. For obtaining an improved track density, the track width of the magnetic head must be made finer and more precise. When perpendicular magnetic recording is carried out on a double-layer perpendicular magnetic recording medium using a SPT head, the distribution of the recording magnetic field generated by the poles in the SPT head differs greatly from that obtained in the case of using a thin-film inductive head for longitudinal magnetic recording. Specifically, the distribution is such that the contour lines of the head recording field strength are distributed concentrically, with the center portion of the main pole exhibiting a maximum strength and the contour lines getting wider and wider between adjacent lines towards the outside. As a result, the magnetic-transition pattern that is recorded is curved such that the magnetic-transition position in the track center portion is located towards the disc rotation direction more than the magnetic-transition pattern in the track edge portion. Such a phenomena has been actually clearly identified based on the result of observation by magnetic force microscopy (MFM).

The aforementioned phenomenon is produced by the fact that the main pole is made of only one magnetic layer. A magnetic head is known in which a shield made of a magnetic material is provided near the main pole of the magnetic head, such as ones disclosed in Patent Document 1 and Non-patent Documents 1 to 6, which are listed below. The techniques disclosed in these documents are designed in light of the increase in magnetic field gradient and are not intended for correcting the problem of curvature of the magnetic-transition pattern in the recording bit cells. While Patent Documents 2 discloses a structure in which the auxiliary pole is provided with a protruding portion, this protruding portion is different from the aforementioned shield, which draws the magnetic field. The protruding portion is also displaced away from the main pole by a distance of several microns, so that it cannot provide the effect provided by the present invention, as will be described below.

(Patent Document 1)
U.S. Pat. No. 4,656,546
(Patent Document 2)
JP Patent Publication (Kokai) No. 2002-92820 A
(Non-patent Document 1)
IEEE Transactions on Magnetics, Vol. 38, No. 4, pp.1719–1724 (2002)
(Non-patent Document 2)
IEEE Transactions on Magnetics, Vol. 38, No. 1, pp.163–168 (2002)
(Non-patent Document 3)
Technical Report of the Institute of Electronics, Information and Communication Engineers, MR2001-87, pp.21–26
(Non-patent Document 4)
Technical Report of the Institute of Electronics, Information and Communication Engineers, MR2002-65, pp.1–6
(Non-patent Document 5)
Abstract No. FA02 of the 47th Annual Conference on Magnetism and Magnetic Materials
(Non-patent Document 6)
Abstract No. FA03 of the 47th Annual Conference on Magnetism and Magnetic Materials

SUMMARY OF THE INVENTION

In addition to the strength of the recording head magnetization and the magnetic field gradient, another important factor for the realization of high recording density is the binarization of the field distribution, particularly the field distribution on the trailing side (downstream of the direction in which the disc rotates) which determines the magnetic-transition pattern of the bits recorded on the medium. If the magnetic-transition pattern is curved with respect to the track direction, the magnetic transition width appears large upon reproduction with a GMR (giant magnet resistive) head or a TMR (tunneling magnetoresistive) head, for example, resulting in an increase in the maximum half width of the isolated pulse as well as the problem of the recording track width being narrowed by an increase in the track recording density. Therefore, in order to achieve higher recording density in the future, the problem of the curvature of the magnetic-transition pattern must be corrected.

It is therefore the object of the invention to provide a perpendicular magnetic recording head capable of rectifying the curvature of the magnetic-transition pattern in the recording bit cells and a magnetic disc apparatus mounting the perpendicular magnetic recording head.

The invention provides a SPT head including a main pole and an auxiliary pole. A magnetic layer is disposed on a trailing side of the main pole. The magnetic layer is provided with a protruding portion protruding towards the main pole. The width of a side of the protruding portion opposite the main pole is smaller than the width of the main pole on the trailing side. The shape of the protruding portion may be rectangular or trapezoidal, for example.

The inventors realized, after calculating the recording magnetic field by three-dimensional computer simulation, that by using the recording head of the above-mentioned shape, the magnetic field distribution can be made linear in the direction of the track width and the curvature of the magnetic-transition pattern in the recording bit cells can be corrected. As the field distribution is made linear in the track width direction, the magnetic-transition width of the recording bits can be decreased, so that the extent of deterioration of the reproduction resolution due to the curvature of the magnetic-transition pattern can be reduced. By mounting the recording head, a magnetic disc apparatus with an improved recording density can be obtained.

BRIEF DESCRIPTION OF THE DRAWINGS

FIGS. 12A–12G shows an example of the process of manufacturing the magnetic head according to the invention.

DETAILED DESCRIPTION OF THE PREFERRED EMBODIMENTS

The invention will be hereafter described by way of embodiments with reference made to the attached drawings.

Figure 1A:
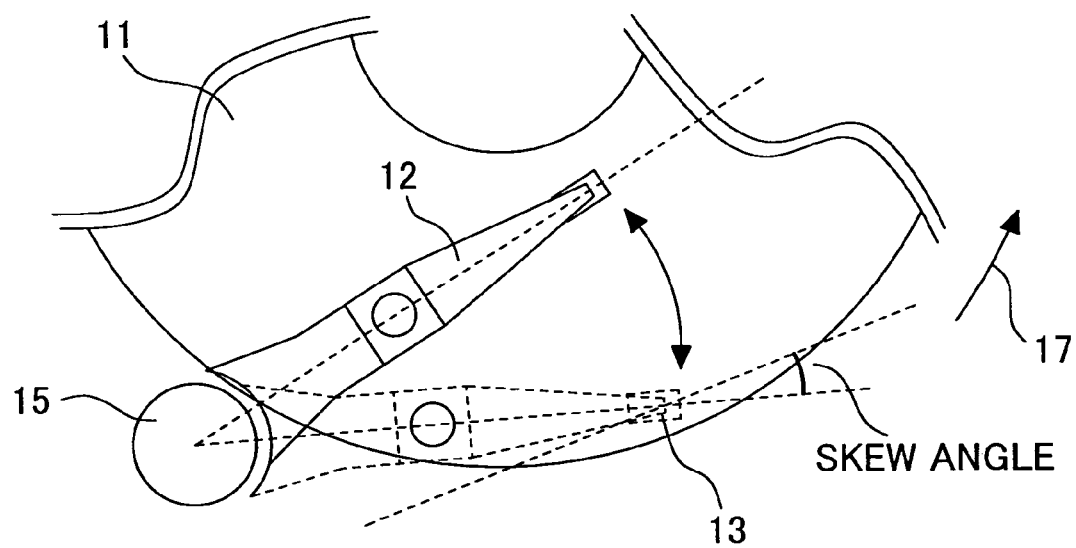
FIGS. 1A–1C shows an example of the magnetic disc apparatus according to the invention.
Figure 1B:
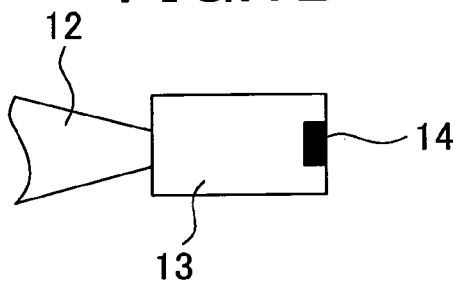
Figure 1C:
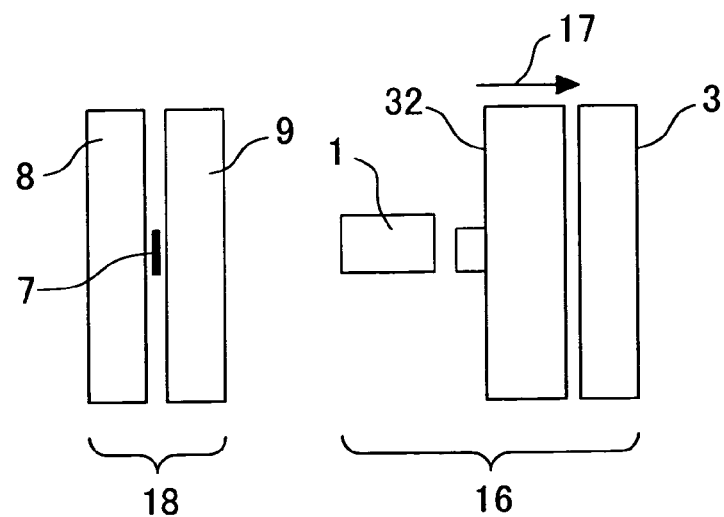

FIG. 1A schematically shows an example of the magnetic disc apparatus according to the invention. FIG. 1B is an enlarged view of a magnetic head slider portion of the apparatus. FIG. 1C is an enlarged view of a magnetic head portion of FIG. 1B as seen from the head air bearing surface.

The magnetic disc apparatus carries out recording and reproduction of a magnetization signal on a magnetic disc 11 rotating in a direction of an arrow 17, using a magnetic head 14. The magnetic head 14 is mounted on a magnetic head slider 13 which is secured to the tip of a suspension arm 12 rotated by a rotary actuator 15. The magnetic head 14 is made up of a recording head 16 and a reproduction head 18. The reproduction head 18 includes a reproduction element 7 disposed between a lower shield 8 and an upper shield 9. The recording head 16 includes a main pole 1, an auxiliary pole 3, and a magnetic layer (shield) 32 that is disposed towards the trailing side of the main pole.

Figure 2:
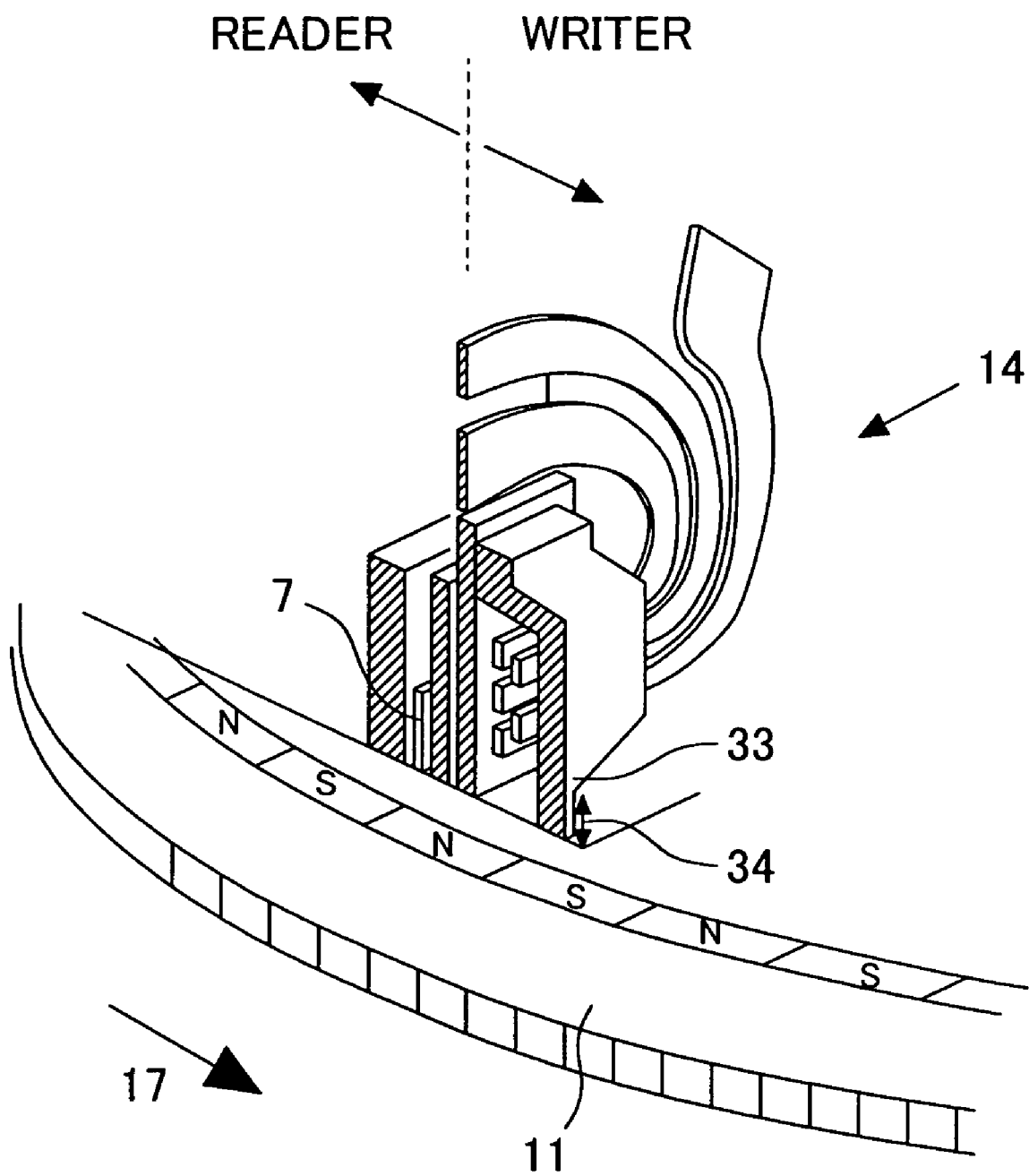
FIG. 2 shows an example of the relationship between a magnetic head and a magnetic disc.

FIG. 2 schematically shows the relationship between the magnetic head 14 and the magnetic disc 11 for perpendicular magnetic recording. The width of the magnetic layer constituting the main pole 1 in the direction of the track is reduced at a position referred to as a flare point 33. A distance 34 between the flare point 33 of the main pole 1 and the air bearing surface is referred to as a throat height.

Figure 3:
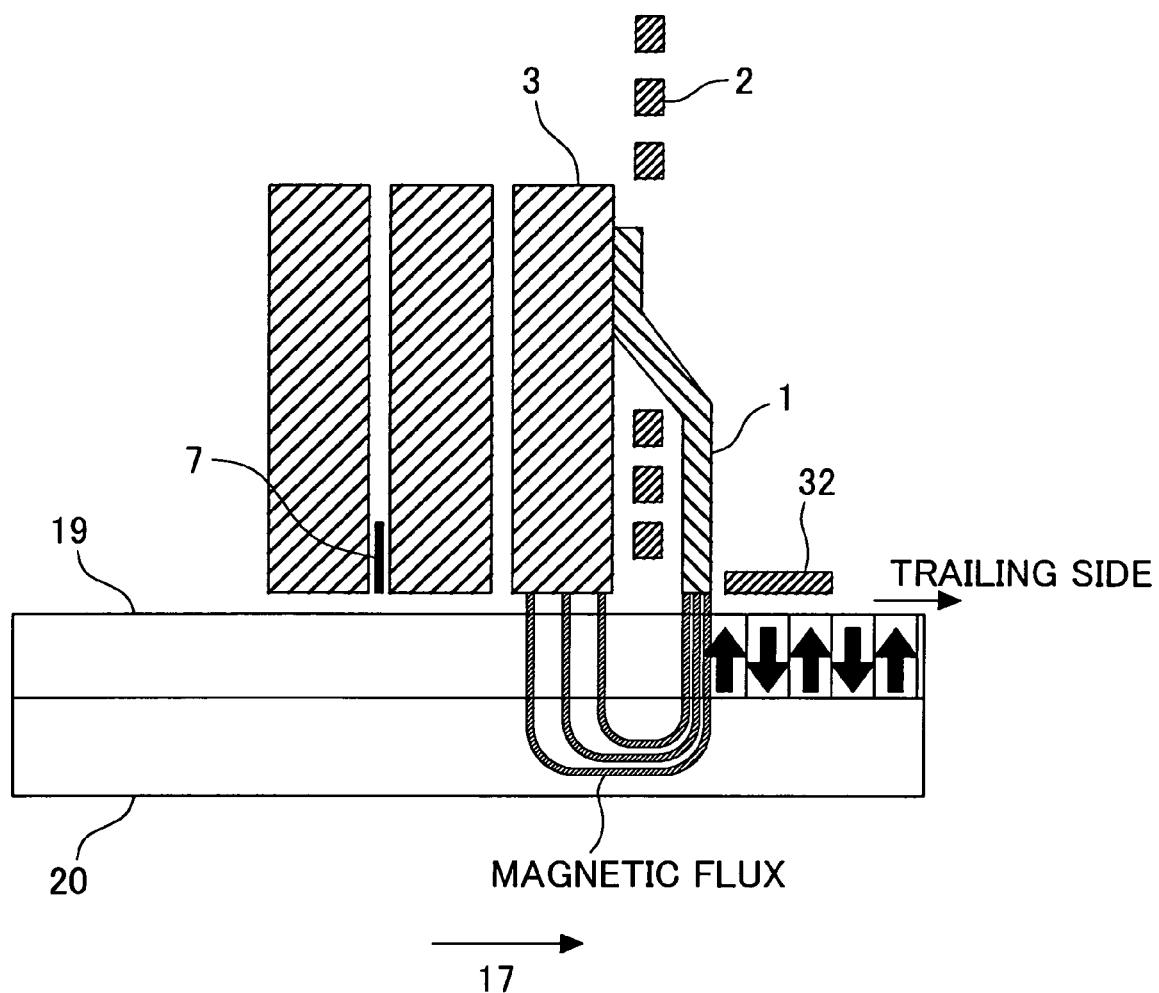
FIG. 3 schematically shows perpendicular recording.

FIG. 3 illustrates the concept of perpendicular recording. A conductive thin-film coil 2 in which a recording signal flows is magnetically coupled with a magnetic circuit made up of the main pole 1, auxiliary pole 3, a recording layer 19, and a soft underlayer 20. The magnetic field leaving the main pole 1 passes through the recording layer 19 and soft underlayer 20 of the magnetic disc (perpendicular magnetic recording medium) and then enters the auxiliary pole 3, thus forming a magnetic circuit and recording a magnetization pattern in the recording layer 19. In some cases, an intermediate layer is formed between the recording layer 19 and the soft underlayer 20. The reproduction element 7 of the reproduction head employs a GMR head or a TMR head.

Figure 4:
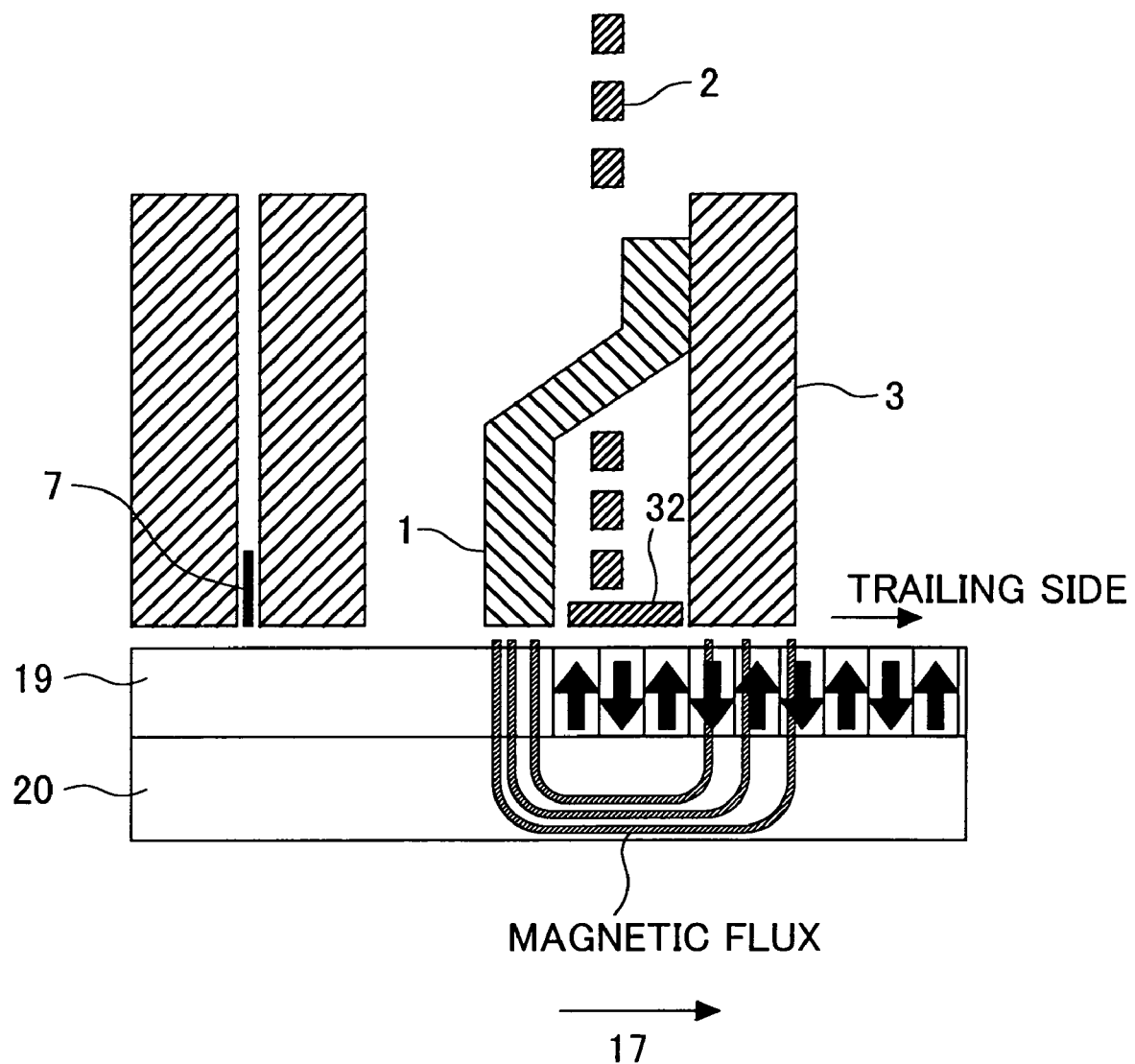
FIG. 4 shows another example of the structure of the magnetic head.

FIG. 4 shows another example of the magnetic head according to the invention, in which the positional relationship between the main pole 1 and the auxiliary pole 3 with respect to the disc rotation direction 17 is opposite to that in the magnetic head shown in FIG. 3. Specifically in the recording head of the magnetic head of FIG. 3 the auxiliary pole 3 is disposed upstream (leading side) of the rotation direction of the disc with respect to the main pole 1, whereas in the recording head of the magnetic head shown in FIG. 4, the auxiliary pole 3 is disposed towards the trailing side with respect to the main pole 1. In the arrangement of FIG. 4, the magnetic layer 32 may be joined to the auxiliary pole 3. Other arrangements may also be adopted, such as one in which the auxiliary pole of the recording head is doubled by the upper shield of the reproducing head. In any of these arrangements of the recording head, the principle of recording on the double-layer perpendicular magnetic recording medium is the same.

Figure 5:
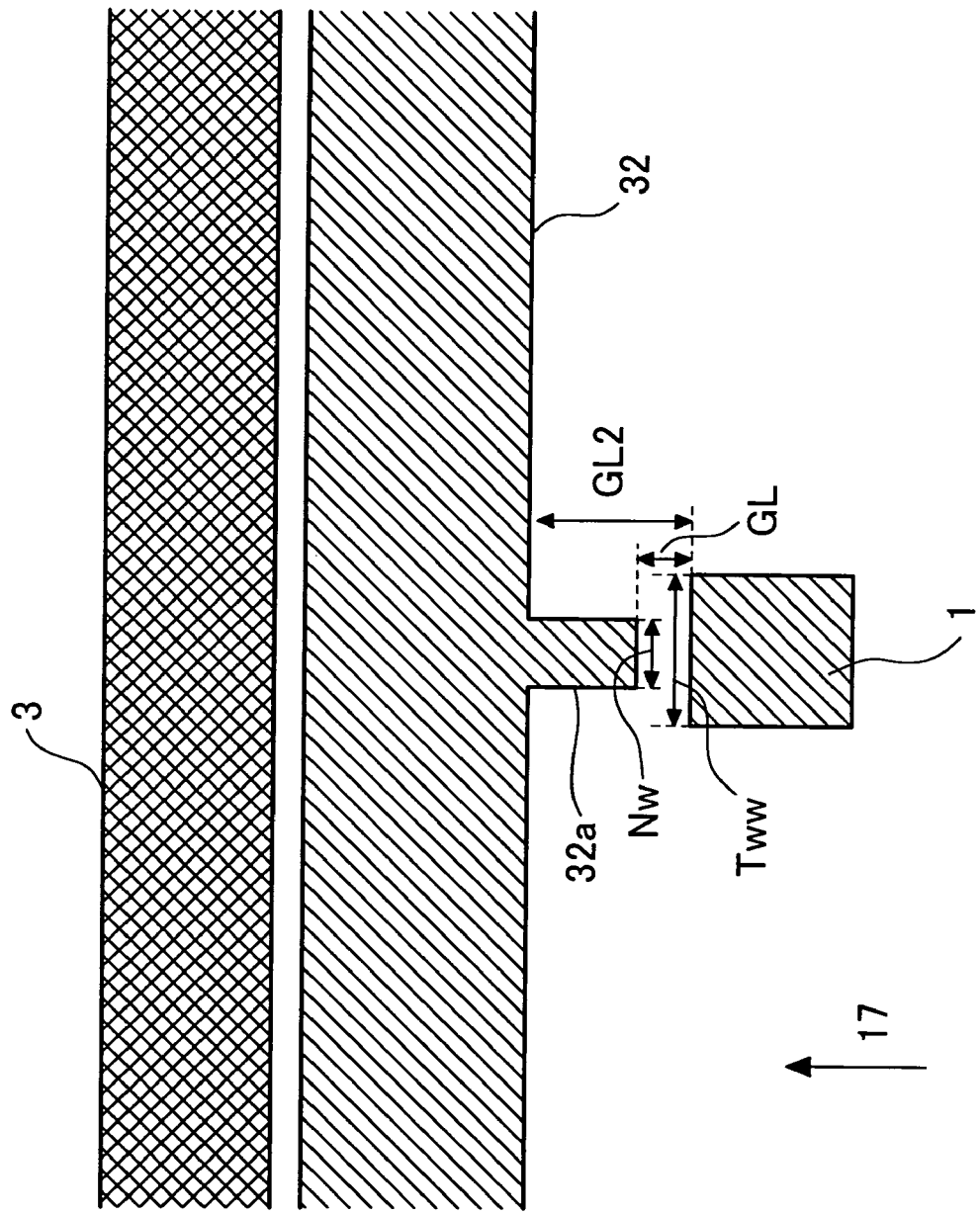
FIG. 5 shows an example of a recording head according to the invention.

FIG. 5 shows an example of the recording head according to the invention as seen from the air bearing surface. The recording head includes a magnetic layer 32 disposed towards the trailing side of the main pole 1. The magnetic layer 32 includes a protruding portion 32a projecting towards the main pole 1. The protruding portion 32a has a width Nw of a side thereof that is closest to the main pole 1 and parallel to the side of the main pole 1 on the trailing side, the width being set to be smaller than a width Tww of the side of the main pole 1 on the trailing side. The magnetic layer 32 may be joined to the auxiliary pole 3.

The auxiliary pole 3 may be disposed either on the leading side of the main pole 1, as shown in FIG. 3, or on the trailing side, as shown in FIG. 4. Alternatively, the auxiliary pole 3 may be disposed on both the leading and trailing sides of the main pole 1. FIG. 5 shows an example where the auxiliary pole is disposed on the trailing side.

The magnetic layer 32 is provided for the purpose of drawing in the recording field and therefore has a different function from the auxiliary pole, and it must have a small thickness in the depth direction of the head. The inventors discovered that by providing the protruding portion 32a opposite the main pole of the magnetic layer 32 such that Tww>Nw, the magnetic field at the center of the main pole can be strongly drawn in via the edge of the main pole, thereby reducing the curvature of the isomagnetic field lines. As the techniques disclosed in Patent Document 1 and Non-patent Documents 1 to 6 draw in the magnetic field across the entire width of the track they cannot prevent the curvature of the isomagnetic field lines.

Figure 6A:
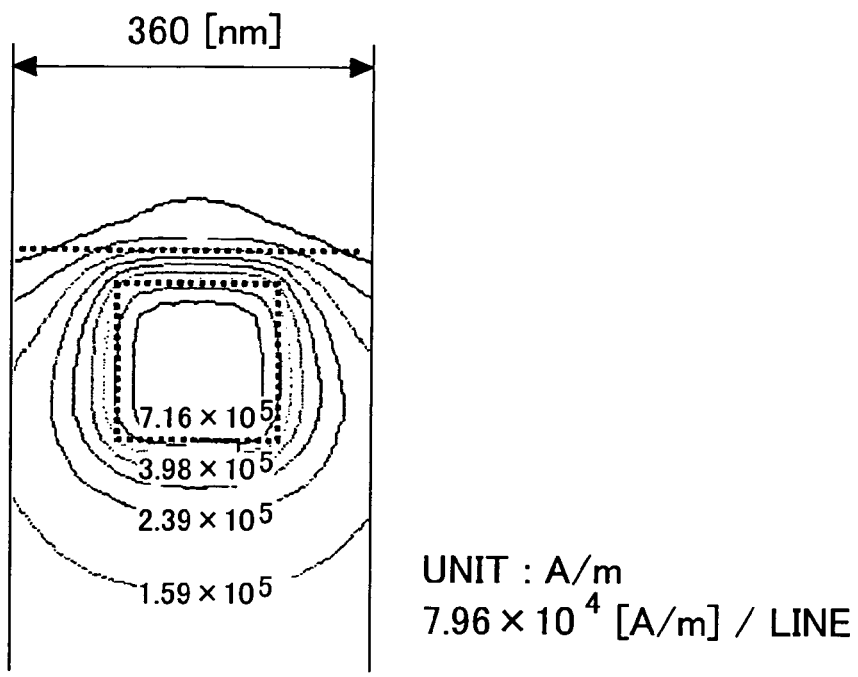
FIGS. 6A and 6B shows isomagnetic field lines of a recording magnetic field.
Figure 6B:
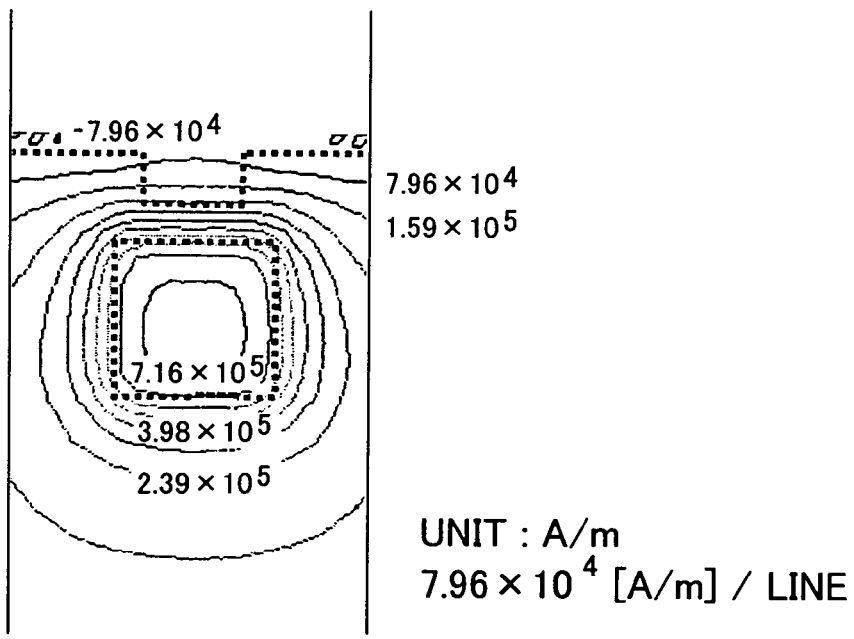

Referring to FIGS. 6 and 7, the three-dimensional magnetic field calculations performed by the inventors will be described. FIG. 6A shows the isomagnetic field lines of the strength of the field generated by the SPT head in which a magnetic layer of the conventional structure without the protruding portion is disposed on the trailing side. FIG. 6B shows the isomagnetic field lines of the strength of the magnetic field generated by the SPT head according to the invention having the structure shown in FIG. 5. The magnetic field strength is the strength of the field at the lengthwise center of the recording layer of the magnetic disc.

The saturated magnetic flux density of the main pole was 2.2 T and the geometric track width was 160 nm. The saturated magnetic flux density of the magnetic layer disposed on the trailing side was 1.0 T. The dotted lines in the drawings indicate the main pole 1 and the portion of the magnetic layer 32 opposite the main pole 1. The contour lines are $7.96 \times 10^4$ A/m apart.

Comparison of FIGS. 6A and 6B shows that the curvature of the isomagnetic field lines on the trailing side is suppressed more in the SPT head of the invention than in the SPT head of the conventional structure. In the case of the SPT head having a magnetic layer (shield) of the conventional structure without the protruding portion, the distance between the isomagnetic field line with one-half the maximum recording field strength and the trailing position of the main pole was 83 nm at track edge and 94 nm at track center, thus resulting in a difference L1 of 11 nm. On the other hand, in the case of the SPT head fitted with the magnetic layer (shield) with the protruding portion according to the invention, the corresponding distance was 89 nm at track edge and 98 nm at track center, resulting in difference L1 of 9 nm, which is smaller, and creating a more linear field distribution.

Figures 7A, 7B:
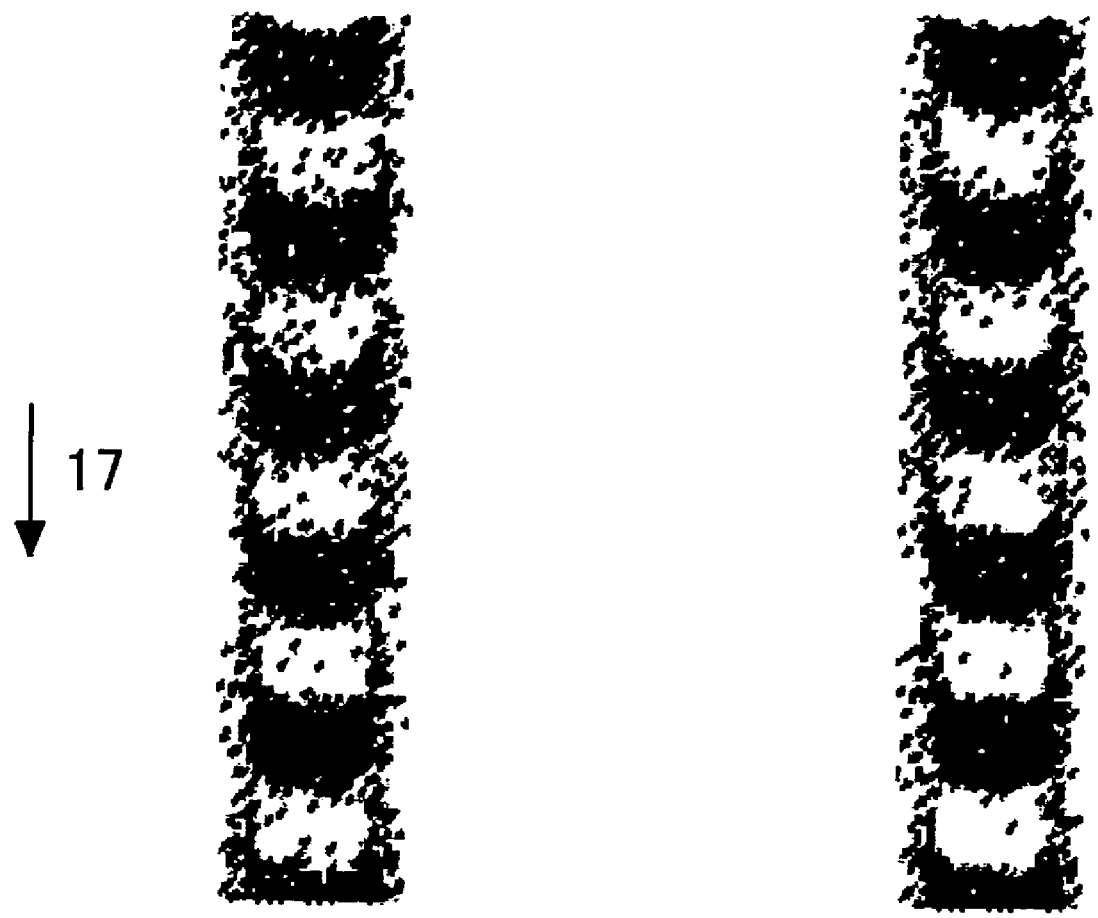
FIGS. 7A and 7B shows recorded magnetization configuration by simulation.

FIGS. 7A and 7B show simulation charts obtained by calculating the recording magnetization configurations of the medium with the use of the two heads shown in FIGS. 6A and 6B, respectively. FIG. 7A corresponds to FIG. 6A and indicates the recording magnetization configuration obtained with the SPT head of the conventional structure. FIG. 7B corresponds to FIG. 6B and indicates the recording magnetization configurations obtained with the SPT head of the invention. The individual configurations were compared under an equal maximum field strength condition. The black portions indicate magnetization in a positive direction, and the white portions indicate magnetization in a negative direction.

It will be seen that the magnetic transition is sharper in the recording magnetization of FIG. 7B obtained with the SPT head of the invention than in that of FIG. 7A obtained with the conventional SPT head. The reproduction resolution of the recording magnetization recorded with the SPT head of the conventional structure was 27.9%, whereas the reproduction resolution obtained when the head structure of the invention was used for recording was 29.6%, thus indicating an improvement. Thus, in accordance with the invention, the reproduction resolution can be improved and a higher-density magnetic disc apparatus can be realized.

Furthermore, the magnetic recording head of the invention can be applied not only to the double-layer perpendicular magnetic recording medium but also to other magnetic recording media having a soft underlayer and still the same effects can be obtained. For example, the same effects can be obtained in oblique anisotropic media.

Figure 8A:
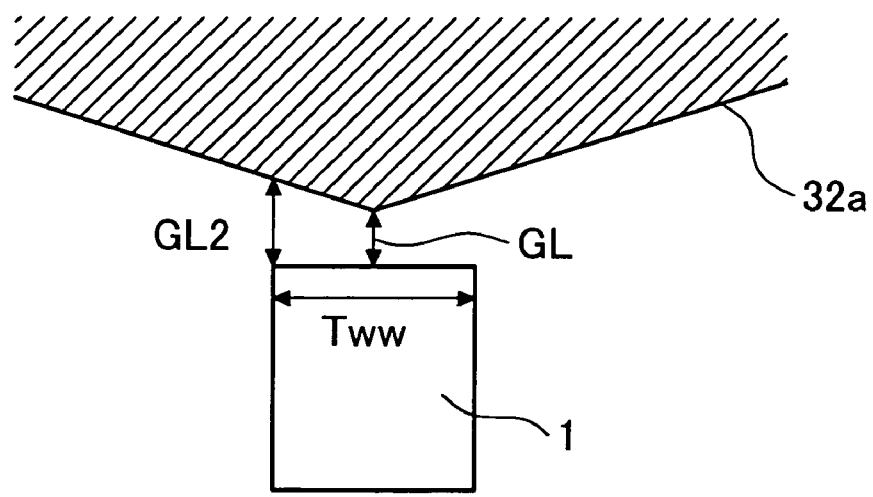
FIGS. 8A and 8B shows a variation of the magnetic layer.
Figure 8B:
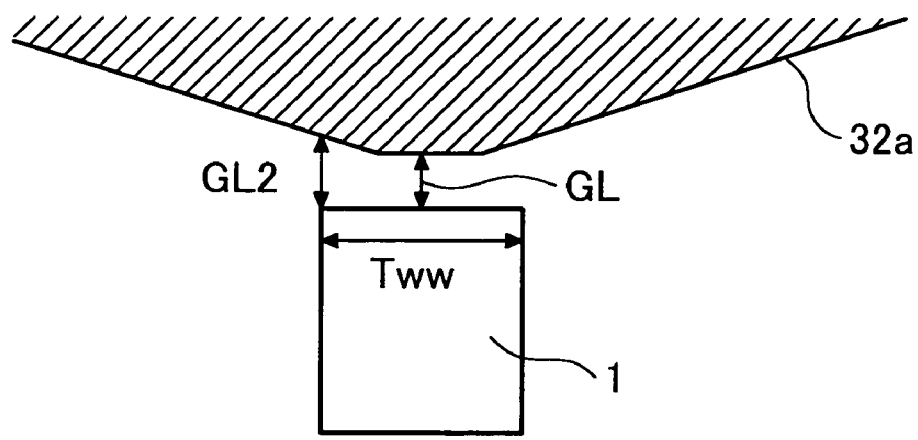

FIG. 8 shows variations of the shape of the magnetic layer opposite the main pole. The shape of the protruding portion of the magnetic layer, which is disposed on the trailing side of the main pole, protruding towards the main pole is not limited to the rectangular shape shown in FIG. 5. For example, the protruding portion may have shapes shown in FIGS. 8A and 8B such that a distance GL between the center of a side of the main pole 1 on the trailing side thereof and the opposite side of the magnetic layer 32 is smaller than a distance GL2 between the edge of the side of the main pole 1 on the trailing side thereof and the side of the magnetic layer 32. In this case too, the same effects of the invention as described above can be obtained.

Figure 9:
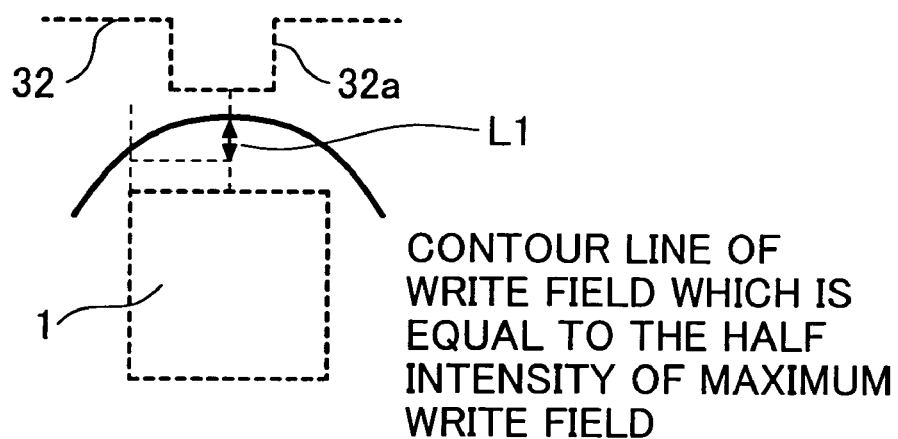
FIG. 9 shows the relationship between the thickness of the magnetic layer and the extent of curvature of the isomagnetic field lines.
Figure 9:
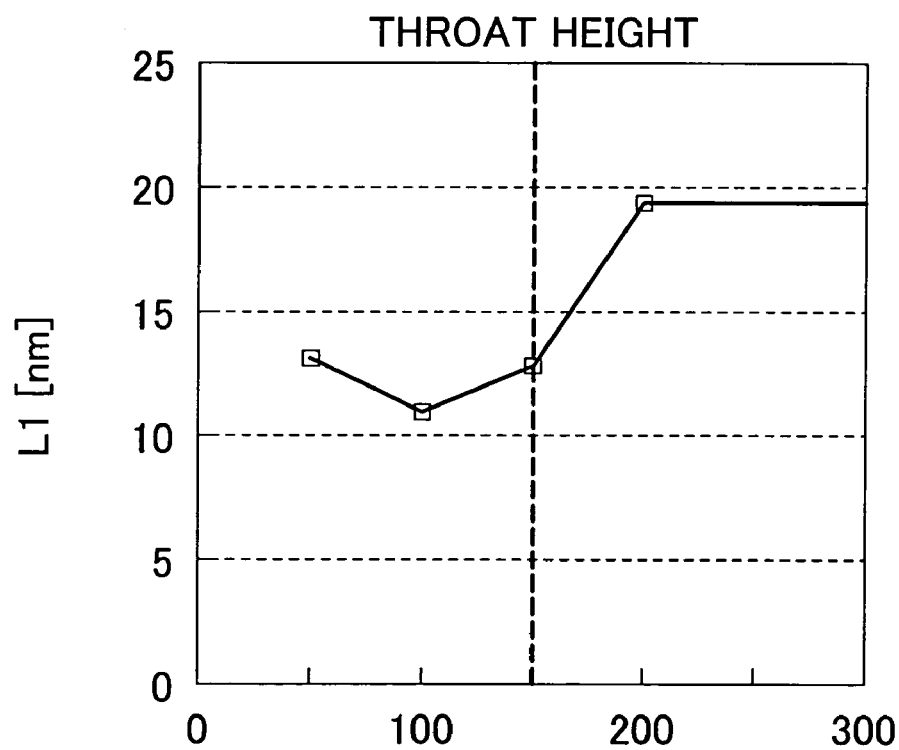

The magnetic layer 32 disposed on the trailing side of the main pole 1 is provided for the purpose of drawing in the recording magnetic field, and the magnetic layer must be thin in the depth direction of the head. FIG. 9 shows the relationship between the thickness of the magnetic layer and the degree of curvature of the isomagnetic field lines. The horizontal axis indicates the thickness of the magnetic layer, and the vertical axis indicates difference L1 between the distances of the isomagnetic field line exhibiting one-half the maximum recording field strength to the main pole at track center and track edge. It will be seen from FIG. 9 that L1 can be decreased by making the thickness of the magnetic layer 32 approximately equal to the throat height, which is the distance between the flare point, where the width of the main pole 1 is narrowed, and the air bearing surface. Thus, it is desirable in the present invention that the thickness of the magnetic layer 32 be smaller than the throat height.

Figure 10:
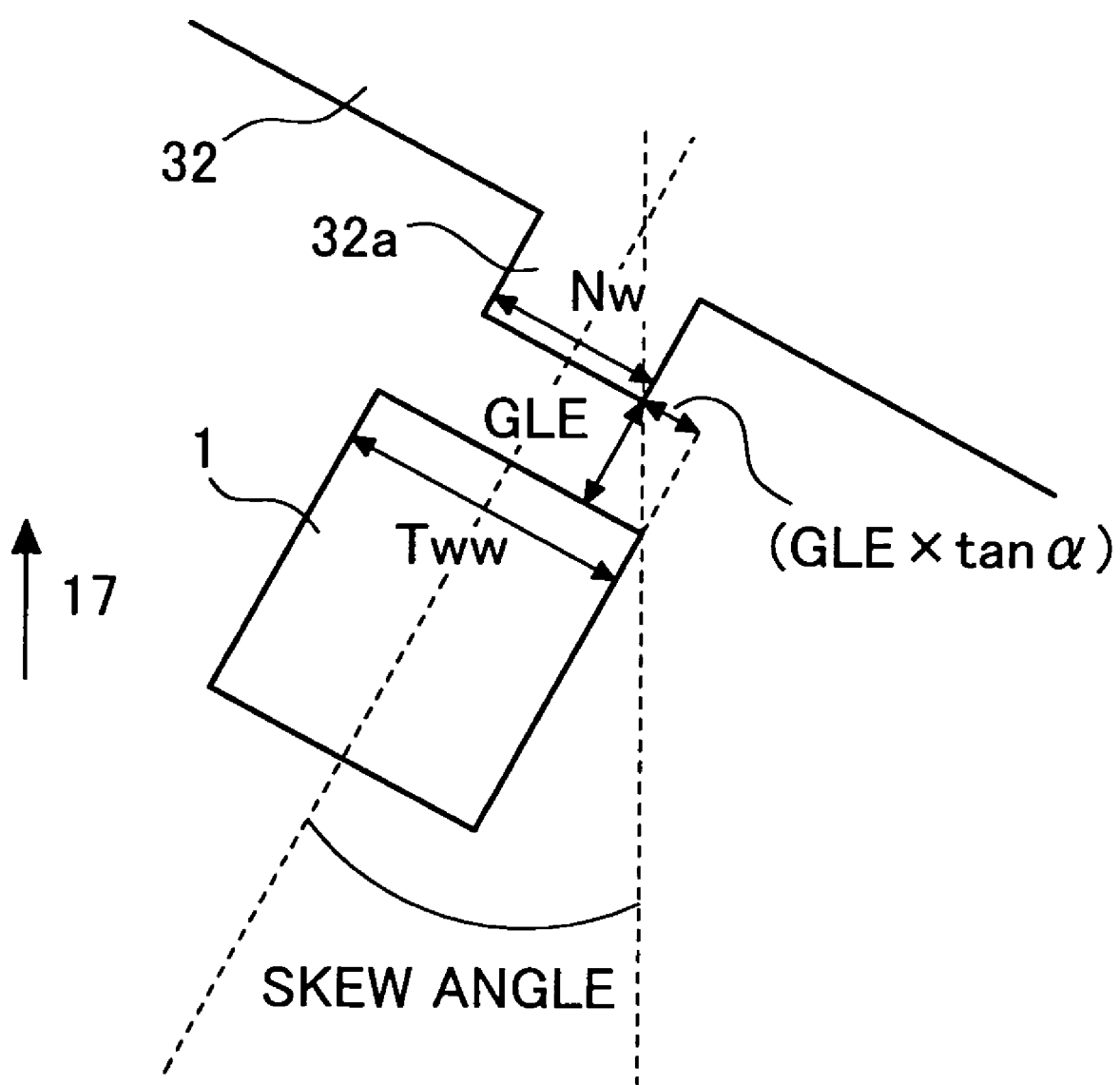
FIG. 10 shows the arrangement of the recording head when there is a skew.

In magnetic disc apparatuses, the side of the main pole 1 towards the trailing side is not necessarily perpendicular to the track direction and could be inclined with a so-called skew angle α, as shown in FIG. 10. The side of the protruding portion 32a opposite the main pole 1, the protruding portion being part of the magnetic layer 32 joined to the auxiliary pole 32 on the trailing side, should desirably not extend beyond the width of the main pole 1 in the track direction even when there is skew angle α. Accordingly, width Tww of the side of the main pole 1 on the trailing side, width Nw of the side of the protruding portion 32a of the magnetic layer 32 opposite the main pole 1, and a distance GLE between the edge of the protruding portion 32a and the main pole 1 should desirably be set with respect to a maximum value α of skew angle such that the following relationship is satisfied in order to make the isomagnetic field lines linear.

$$0.5 \times (Tww - Nw) \leq GLE \times \tan \alpha$$

Figure 11:
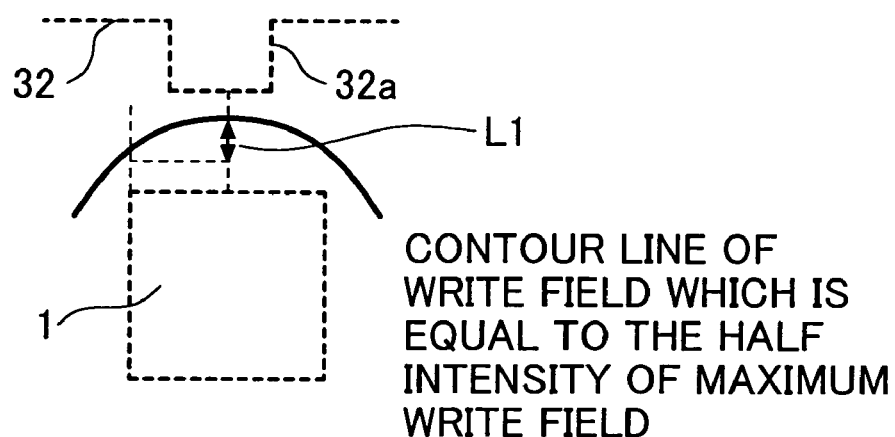
FIG. 11 shows the relationship between the distance between the main pole and the magnetic layer and the extent of curvature of the isomagnetic field lines.
Figure 11:
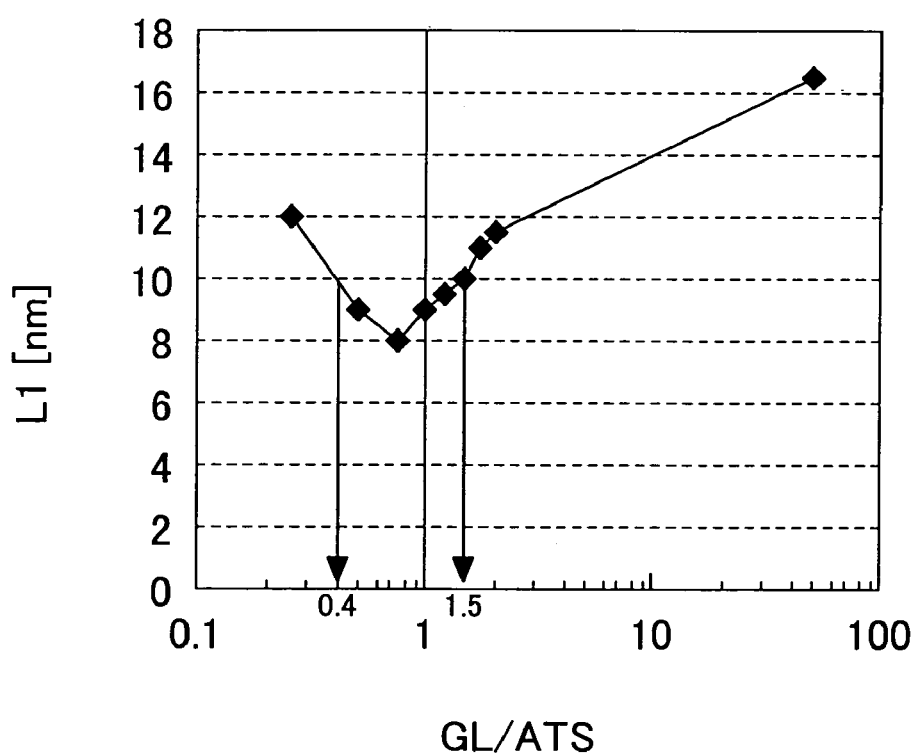

FIG. 11 shows the relationship between the distance between the main pole and the magnetic layer and the degree of curvature of the isomagnetic field lines. The horizontal axis of FIG. 11 indicates the value obtained by standardizing a minimum distance GL between the main pole and the magnetic layer joined to the auxiliary pole disposed on the trailing side of the main pole, using a distance ATS between the air bearing surface of the main pole and the soft underlayer. The vertical axis of FIG. 11 indicates difference L1 between the distances between the isomagnetic field line exhibiting one-half the maximum recording field strength and the main pole at track center and track edge. The greater L1 is, the more the isomagnetic field lines are curved. It will be seen from FIG. 11 that if GL is large, L1 also becomes large and the effect of making the isomagnetic field lines linear cannot be obtained. Conversely, if GL is too small, L1 becomes large, resulting in a reduced effect of making the isomagnetic field lines linear. The figure indicates that L1 can be reduced to 10 nm or less in a range of GL/ATS between 0.4 and 1.5, where an enhanced effect of making the isomagnetic field lines linear can be obtained.

FIG. 12 shows an example of the process of manufacturing the magnetic head according to the invention, as seen from the direction of the air bearing surface of the head.

Initially, as shown in FIG. 12A, an inorganic insulating film 101, a magnetic film 102 to be made into a main pole, an inorganic insulating film 103 to be made into a gap, a magnetic film 104 to be made into a protruding portion of the magnetic layer (shield), a stopper 105 for chemical-mechanical polishing (CMP), and an inorganic insulating film 106 are sequentially stacked in the mentioned order. This is followed by the formation of a resist 107 with a shape shown using a lift-off technique. Then, ion milling is carried out as shown in FIG. 12B to render the magnetic film 102 into the shape of a main pole. Thereafter, an inorganic insulating film 101' is formed as shown in FIG. 12C, followed by the formation of a magnetic layer piece 104 having a width smaller than that of the main pole by ion milling, as shown in FIG. 12D. The magnetic layer piece 104 constitutes the protruding portion disposed on the trailing side of the main pole.

Then, an inorganic insulating film 101' is formed as shown in FIG. 12E, which is then planarized by CMP, as shown in FIG. 12F. Thereafter, there is formed a groove for forming a pillar for joining the main pole and the auxiliary pole and for forming a magnetic layer disposed on the trailing side of the main pole except where the protruding portion exists, and a magnetic layer 104' is formed in the groove. Then, the portions encircled by dotted lines in FIG. 12F are removed by milling, thereby obtaining the head structure of the invention shown in FIG. 12G.

Thus, the invention provides a recording head capable of correcting the curvature of the magnetic-transition pattern in the recording bit cells. By mounting the recording head, a magnetic disc apparatus can be obtained that is suitable for high recording densities.

What is claimed is:

1. A magnetic head comprising a recording head including a main pole and an auxiliary pole, wherein a magnetic layer is disposed on a trailing side of the main pole, the magnetic layer having a protruding portion protruding towards the main pole, wherein the width of a side of the protruding portion opposed to the main pole is smaller than the width of the main pole on the trailing side.

2. The magnetic head according to claim 1, wherein the auxiliary pole is disposed on the trailing side of the main pole farther from the main pole than the magnetic layer.

3. The magnetic head according to claim 2, wherein the magnetic layer is joined to the auxiliary pole.

4. The magnetic head according to claim 1, wherein the auxiliary pole is disposed on the leading side of the main pole.

5. The magnetic head according to claim 1, further comprising a reproducing head having a magnetoresistive element.

6. The magnetic head according to claim 1, wherein the thickness of the magnetic layer in the direction perpendicular to an air bearing surface of the magnetic layer is smaller than a throat height of the main pole.

7. A magnetic disc apparatus comprising:
    a disc-shaped perpendicular magnetic recording medium having a recording layer and a soft underlayer;
    a magnetic head including a recording head and a reproducing head; and
    a rotary actuator for positioning the magnetic head with respect to the disc-shaped perpendicular magnetic recording medium, wherein
    the recording head includes a main pole, an auxiliary pole, and a magnetic layer disposed on the trailing side of the main pole, the magnetic layer having a protruding portion protruding towards the main pole, wherein the width of a side of the protruding portion opposite the main pole is smaller than the width of the main pole on the trailing side.

8. The magnetic disc apparatus according to claim 7, wherein a maximum skew angle $\alpha$, a width Nw of the side of the protruding portion of the magnetic layer opposite the main pole, a width Tww of the main pole on the trailing side, and a distance GLE between the protruding portion of the magnetic layer and the main pole satisfy the relationship $0.5 \times (Tww - Nw) \leq GLE \times \tan \alpha$.

9. The magnetic disc apparatus according to claim 7, wherein a ratio of a minimum distance GL between the main pole and the magnetic layer to a distance ATS between an air bearing surface of the main pole and a soft underlayer in the disc-shaped perpendicular magnetic recording medium (GL/ATS) is in the range between 0.4 and 1.5.

10. A process of manufacturing a magnetic head comprising a recording head including a main pole, an auxiliary pole, and a magnetic layer disposed on the trailing side of the main pole, the magnetic layer having a protruding portion protruding towards the main pole, wherein the width of a side of the protruding portion opposed to the main pole is smaller than the width of the main pole on the trailing side, the process comprising the steps of:
    forming a stacked film in which a first magnetic film to be formed into the main pole, a non-magnetic film to be formed into a gap, a second magnetic film to be formed into the protruding portion, a chemical mechanical polishing stopper film, and an inorganic insulating film are sequentially stacked;
    forming a resist pattern on the stacked film by a lift-off method;
    processing the first magnetic film into the shape of the main pole by ion milling using the resist pattern as a mask;
    forming an inorganic insulating film around the first magnetic film processed in the shape of the main pole and the non-magnetic film forming the gap; and
    processing the second magnetic film into a magnetic layer piece forming the protruding portion by ion milling.

* * * * *